(12) United States Patent
Suda et al.

(10) Patent No.: US 7,896,406 A0
(45) Date of Patent: Mar. 1, 2011

(54) HOSE CONNECTOR

(75) Inventors: Michael D. Suda, Warrington, PA (US);
Jeffrey Sacks, Hatfield, PA (US);
Christopher Laidley, Roslyn, PA (US)

(73) Assignee: CertainTeed Corporation, Valley Forge, PA (US)

( * ) Notice: Subject to any disclaimer, the term of this patent is extended or adjusted under 35 U.S.C. 154(b) by 1324 days.

(21) Appl. No.: 10/768,454

(22) Filed: Jan. 30, 2004

(65) Prior Publication Data

US 2005/0167983 A1 Aug. 4, 2005

(51) Int. Cl.
*F16L 21/00* (2006.01)

(52) U.S. Cl. ......... 285/354; 285/903; 285/369; 285/386; 285/417

(58) Field of Classification Search .................. 285/903, 285/354, 388, 369, 386, 387, 417
See application file for complete search history.

(56) References Cited

U.S. PATENT DOCUMENTS

| | | | | | |
|---|---|---|---|---|---|
| 920,963 | A | * | 5/1909 | Keyes | 285/386 |
| 2,474,319 | A | * | 6/1949 | Muller | 285/343 |
| 3,934,902 | A | * | 1/1976 | McNamee | 285/133.21 |
| 4,437,691 | A | * | 3/1984 | Laney | 285/353 |
| 4,625,998 | A | | 12/1986 | Draudt et al. | |
| 4,637,636 | A | * | 1/1987 | Guest | 285/38 |
| 4,763,932 | A | | 8/1988 | Matz et al. | |
| 4,795,197 | A | | 1/1989 | Kaminski et al. | |
| 4,951,720 | A | * | 8/1990 | Grantham | 285/122.1 |
| 5,165,729 | A | | 11/1992 | Masseth et al. | |
| 5,285,744 | A | | 2/1994 | Grantham et al. | |
| 5,346,264 | A | | 9/1994 | Law et al. | |
| 5,350,204 | A | | 9/1994 | Henniger | |
| 5,472,244 | A | * | 12/1995 | Nishikata et al. | 285/354 |
| 5,507,535 | A | | 4/1996 | McKamey et al. | |
| 5,794,986 | A | * | 8/1998 | Gansel et al. | 285/148.16 |
| 6,102,445 | A | | 8/2000 | Thomas | |
| 6,206,050 | B1 | | 3/2001 | Kelley et al. | |
| 6,371,148 | B1 | | 4/2002 | Tripp | |
| 6,523,230 | B1 | | 2/2003 | Weinhold | |
| 6,540,262 | B1 | | 4/2003 | Humphreys | |
| 6,557,905 | B2 | * | 5/2003 | Mack et al. | 285/330 |
| 6,764,107 | B1 | * | 7/2004 | Obahi et al. | 285/322 |

FOREIGN PATENT DOCUMENTS

GB 2243889 * 11/1991 ............ 285/903

OTHER PUBLICATIONS

INTEC, "Force/2", May 12, 2003, 3 pp., http:www.inteccorp.com/Products.cfm?Product=Force2.
SF Products, "Insulation Blowing Hose and Blowing Hose Accessories", May 12, 2003, 5 pp., http://www.sfproducts.com/hose.htm.
Giesken Insulating Equipment & Repair, Model 210 & 310, May 12, 2003, 6 pp., http://www.giesken.com/catalog/products.htm.

* cited by examiner

*Primary Examiner* — David Bochna
(74) *Attorney, Agent, or Firm* — Duane Morris LLP

(57) ABSTRACT

A hose connector includes a cylindrical elongated member having a first and second end, a first and second inner sleeve rotatably mounted on the cylindrical member, and a first and second outer sleeve capable of connecting to the respective first and second inner sleeves.

17 Claims, 4 Drawing Sheets

HOSE CONNECTOR

FIELD OF THE INVENTION

The present invention relates to hose connectors, and more particularly to hose connectors for connecting and disconnecting hoses for applying loosefill insulation.

BACKGROUND OF THE INVENTION

Insulation may be dispensed in a variety of ways. Generally, a hose is used to dispense the loosefill insulation. The operator positions a hose nozzle in a desired direction and dispenses the insulation from the loosefill source into the area at which the nozzle is aimed. Transporting the loosefill insulation from the source of loosefill into an area, such as an attic or basement, often requires the use of more than a single hose. Hose connectors are employed to connect and extend the hosing to reach longer distances. Typically, these hose connectors are 6" long steel tubes. The hoses fit over the ends of these tubes and are secured to the tube by screw-type metal hose clamps. The use of such tubes and clamps is time consuming and requires a screw driver to secure the hoses, and are also subject to corrosion and deformation, and tend to cause the hoses to wear prematurely adjacent the clamp. Further, the use of such tubes and clamps does not allow for the rotation of the hoses relative to the connector once the clamps are tightened.

U.S. Pat. No. 4,625,998 to Draudt et al. discloses a swivel hose coupling including a swivel insert that connects to the end of a hose and a swivel hose end piece which is rotatably connected to a hose end by the swivel insert. The swivel hose end piece has an internal groove in which an exterior portion of the swivel insert is rotatably received. Prior to assembly of the swivel hose end piece onto the swivel insert, the end piece should be heated to approximately 100°–110° F. to make it more pliable so that it will stretch, thus facilitating an easier pushing of the end piece onto the swivel insert after the swivel insert has been screwed onto the hose end.

U.S. Pat. No. 6,102,445 to Thomas discloses a sealed coupling system for metal flexible hoses which includes a fitting assembly with inner and outer fittings adapted for threaded interconnection on the end of the flexible hose. The inner fitting includes a bore which receives a washer assembly with an O-ring for forming a sealing connection, a backer ring and an expandable washer. The expandable washer is selectively receivable on the corrugations of the flexible hose and functions to retain the fitting and washer assemblies securely in place and to prevent pull-out of the coupling while providing a positive connection to the hose whereby the O-ring gasket can be compressed for sealing.

U.S. Pat. No. 4,795,197 to Kaminski et al. discloses a coupling for corrugated flexible hoses which includes two generally semi-cylindrical portions which are molded as a single unit with an integral hinge and locking structure. The inner surface of the cylindrical member is corrugated to correspond to the corrugations on the flexible hose, and an end portion of the coupling device includes an annular groove which mates with a flange on the outlet. The locking structure automatically latches as the semi-cylindrical portions are closed around the hose and the flange. Such a coupling does not allow for rotation of the hoses.

Thus, there is currently a need for an improved hose connector and method for connecting hoses between a loosefill source and an area of laying the loosefill insulation.

SUMMARY OF THE INVENTION

The present invention comprises a hose connector comprising a cylindrical elongated member having a first and second end, a first and second inner sleeve rotatably mounted on the cylindrical member, and a first and second outer sleeve capable of connecting to the respective first and second inner sleeves.

The hose connector and method as described herein may advantageously be used to connect hoses, such as loose fill insulation hoses. Unlike current connectors that are time consuming, unyielding and require tools to employ, the present connector allows for rotation of the hoses, does not require the use of tools to use, and provides for quick assembly and disassembly of the hoses.

According to another aspect of this invention, a hose assembly comprises a hose connector and at least one hose. The hose connector comprises a cylindrical elongated member having a first and second end, a first and second inner sleeve rotatably mounted on the cylindrical member, and a first and second outer sleeve, each connected to the respective first and second inner sleeves to form a first and second combined sleeve and including threads on an inside surface thereof. The at least one hose includes corrugations. The corrugations are threadably engaged with the threads of the first and second outer sleeves.

According to another aspect, a method of connecting two hoses comprises providing a hose connector, providing at least one hose having corrugations, and screwing the hose onto the hose connector. The hose connector includes a cylindrical elongated member having a first and second end, a first and second inner sleeve rotatably mounted on the cylindrical member, and a first and second outer sleeve, each having threads on an inside surface thereof, and connected to the respective first and second inner sleeves to form a first and second combined sleeve.

According to a further aspect, a hose connector includes a cylindrical elongated member having a first and second end, and a first and second sleeve rotatably mounted on the cylindrical member and capable of threadably engaging at least one hose.

The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which.

DETAILED DESCRIPTION

Figure 1:
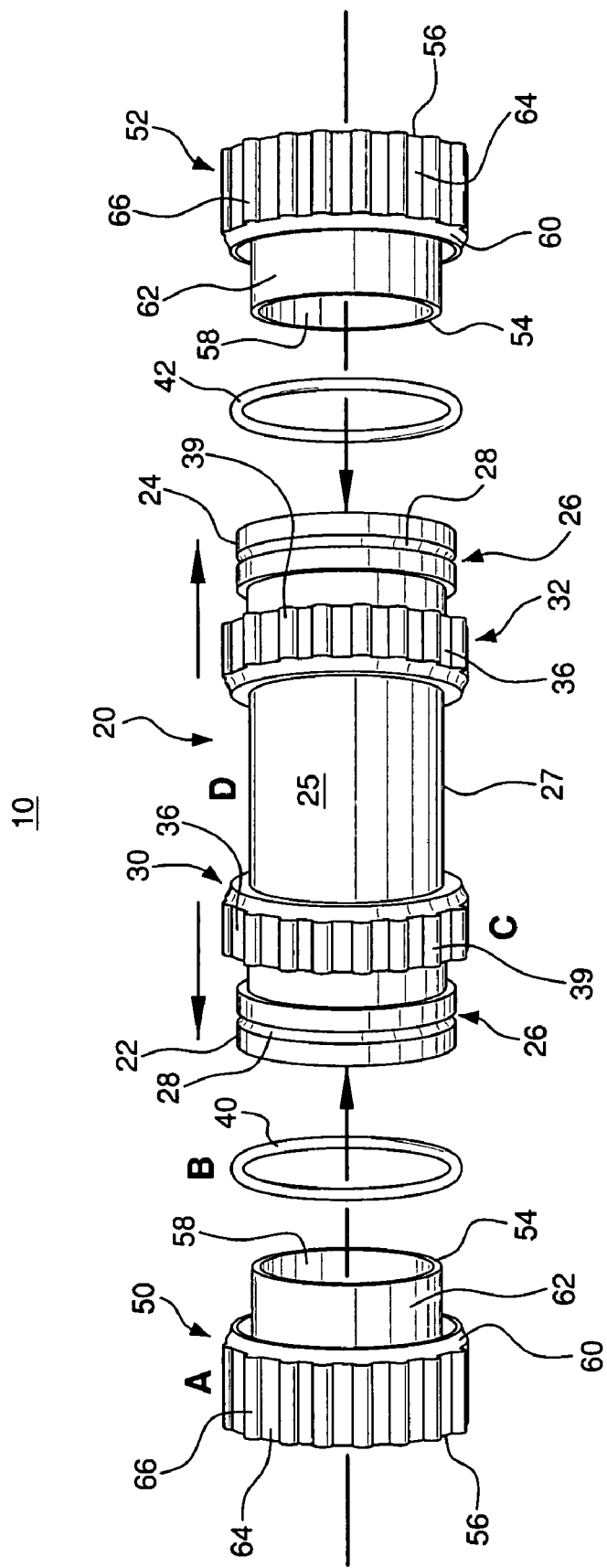
FIG. 1 is an exploded view of a hose connector according to one aspect of the present invention.

This description of the exemplary embodiments is intended to be read in connection with the accompanying drawings, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. While the hose connectors of this invention are useful in loosefill insulation applications, the invention can also serve other end uses, such as drainage, irrigation, fluid transfer, HVAC automotive, and aerospace applications. The connectors of this invention are particularly useful in connecting corrugated pipe.

Referring to FIG. 1, hose connector 10 comprises a cylindrical elongated member 20, a first inner sleeve 30, a second inner sleeve 32, a first outer sleeve 50, and a second outer sleeve 52. Preferably, the hose connector 10 also includes a first gasket 40 and a second gasket 42. The elongated member 20, first and second inner sleeves 30, 32, and first and second outer sleeves 50, 52 may be formed of any suitable material, such as, for example, metal or plastic. Also, the diameter of the cylindrical member 20, sleeves, 30, 32, 50, 52, and gaskets 40, 42 may vary in accordance with the diameter of the hoses which are being connected via the hose connector.

Cylindrical elongated member 20 includes a first end 22, a second end 24, a main body portion 25, and an inner surface (not shown). First end 22 and second end 24 include a raised portion 26 preferably having a groove 28 therein. The raised portion 26 of the first and second ends 22, 24 acts to keep the first and second inner sleeves from sliding off the main body portion 25. The grooves 28 acts to retain a respective gasket 40, 42.

First and second inner sleeves 30, 32 include an inside surface (not shown) and an outside surface 36. At least a portion of the inside surface of each inner sleeve 30, 32 is preferably threaded for mating with a respective and reverse threaded outer sleeve 50, 52. Alternatively, the inner sleeves 30, 32 and outer sleeves 50, 52 may include other mating means for interlocking the first inner sleeve with the first outer sleeve and the second inner sleeve with the second outer sleeve, such as, for example, a snap-lock mechanism. The smallest diameter of the inside surface of the inner sleeves is preferably sufficiently greater than the diameter the outside surface 27 of the main body portion 25 of the cylindrical member 20 to allow for the rotational movement of the sleeves 30, 32 relative to the cylindrical member 20. The smallest diameter of the inside surface of the inner sleeves, however, is preferably smaller than the diameter of the raised portion 26 of the first and second ends 22, 24 of the elongated member 20 to retain the inner sleeves on the elongated member and prevent them from slipping off the ends 22, 24. Preferably, the outside surface 36 of the inner sleeves 30, 32 include a gripping mechanism, such as, for example, ribs 39 for facilitating the connection or disconnection of a respective inner and outer sleeve.

First and second gaskets 40, 42 are preferably formed of rubber or other elastomeric material and, when installed on the hose connector 10, are seated within the grooves 28 of the raised portions 26. The gaskets 40, 42 provide light resistance against rotation of the inner and outer sleeves, and also aid in preventing the hose connector 10 from seeping air.

Figure 3:
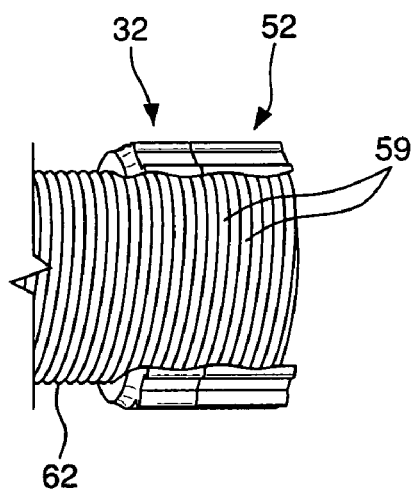
FIG. 3 is a partial cross-sectional view of an outer sleeve of the hose connector of FIG. 1, shown with an inserted hose.

Outer sleeves 50, 52 include a first end 54, a second end 56, an inside surface 58, and an inner sleeve mating portion 60. At least a portion of the inside surface 58 is threaded for facilitating the insertion of the corrugated hoses 70, 72 (see FIG. 3). The threads 59 are dimensioned to threadably engage the corrugations 74 on the hoses 70, 72, and preferably facilitate a substantially air tight connection. The diameter of the outer surface 62 of the first end 54 of outer sleeves 50, 52 is smaller than the diameter of the inner surface of the cylindrical member 20 to allow for insertion of the first end 54 of the outer sleeves 50, 52 into the respective first 22 or second 24 end of the cylindrical member 20. Preferably the inner sleeve mating portion 60 is threaded for mating with a respective inner sleeve 30, 32. However, as stated above, the mating portion may comprise other mating means, such as, for example, a snap-lock mechanism for facilitating a connection with a respective inner sleeve. The outer surface 64 of the second end 56 of the outer sleeves 50, 52, preferably include a gripping mechanism, such as, for example, ribs 66 for facilitating the connection of a respective inner and outer sleeve.

Figure 2:
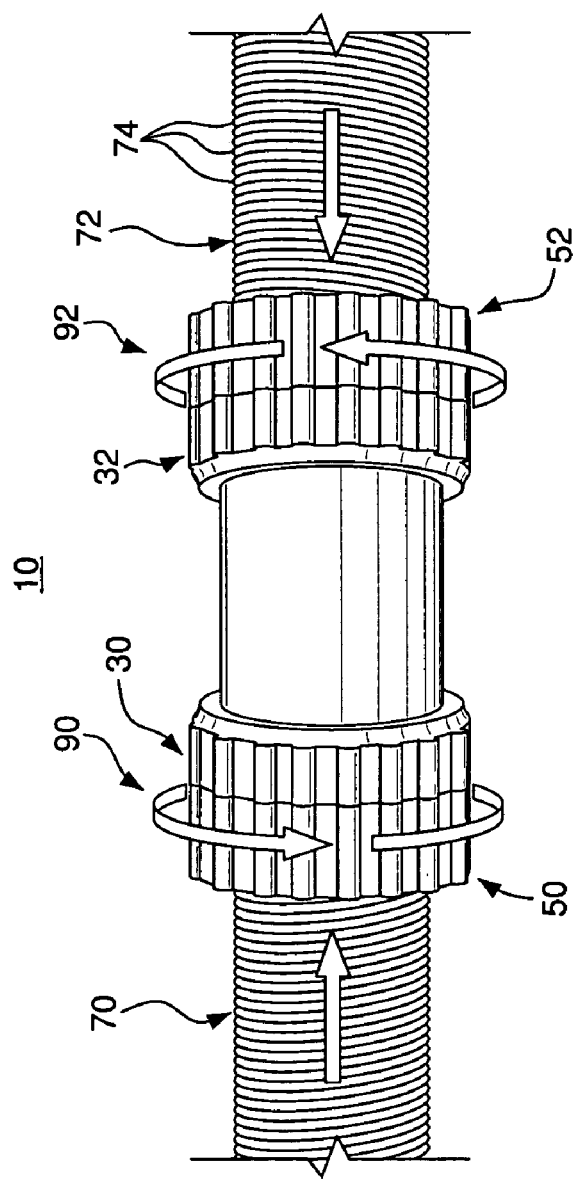
FIG. 2 is a side elevational view the hose connector of FIG. 1, shown connecting two hoses.

Referring to FIG. 2, the hose connector 10 is shown connecting a first and second hose 70, 72. Before the hoses are connected via the hose connector 10, the components of the hose connector are assembled by placing the gaskets 40, 42 into the grooves 28 of the raised portions 26 of the elongated member 20, inserting the first end 54 of the outer sleeves 50, 52 into a respective first or second end 22, 24 of the elongated body 20, and then connecting, preferably threadably connecting, the respective inner and outer sleeves to form a first and second combined sleeve 90, 92.

The first and second hoses 70, 72 comprise corrugations 74 on at least an outside surface. The corrugations 74 may comprise separate alternating ribs and grooves, or alternatively, a substantially continuous helical or spiral rib with a corresponding substantially continuous helical or spiral groove, which resembles the threads of a screw. To connect the hoses 70, 72 to respective ends of the hose connector 10, an end of each hose 70, 72 is placed into the second end 56 of the respective outer sleeve 50, 52. The combined sleeves 90, 92 are then twisted causing the corrugations on the hoses 70, 72 to threadably engage the threads 59 on the inside surface 58 of the outer sleeves 50, 52. Preferably, the threads 59 on the inner surface 58 of the first outer sleeves 50, 52 are configured such that the hoses 70, 72 are drawn into hose connector 10 when the combined sleeves 90, 92 are rotated in the direction shown by the arrows in FIG. 2. To disconnect the hoses, the combined sleeves 90, 92 are rotated in the opposite direction shown by the arrows. The combined sleeves 90, 92 can rotate around the main body portion 25 allowing the hoses 70, 72 to swivel. The resistance provided by gaskets 40, 42, in addition to the outward force applied by the hoses against the threads 59 of the inside surface 58 of the outer sleeves 50, 52, helps prevent the combined sleeves 90, 92 from unscrewing and releasing the hoses from the hose connector 10.

Figure 4:
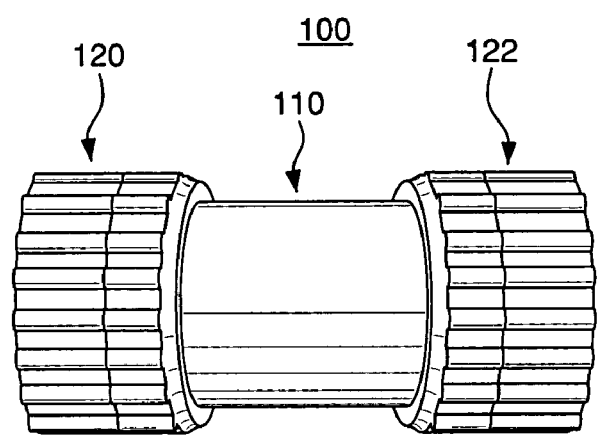
FIG. 4 is a side elevational view of an alternative hose connector.

Referring to FIG. 4, in an alternative embodiment, the hose connector 100 comprises a cylindrical elongated member 110 having a first and second end (not shown), and a first and second sleeve 120, 122 rotatably mounted on the cylindrical member 110. Preferably, the hose connector 100 also includes a first and second gasket (not shown). Hose connector 100 is substantially similar to hose connector 10 described above, with the exception that the first and second inner and outer sleeves 30, 32, 50, 52 of hose connector 10 are formed of a single piece of material as first sleeve 120 and second sleeve 122, and thus do not need to be connected together.

Although the invention has been described in terms of exemplary embodiments, it is not limited thereto. Rather, the appended claims should be construed broadly, to include other variants and embodiments of the invention which may be made by those skilled in the art without departing from the scope and range of equivalents of the invention. For example, in addition to connecting two hoses, the hose connector can be used to connect a hose, for example, to an insulation dispensing apparatus, a pipe, another coupling device, or the like.

What is claimed is:

1. A hose connector comprising:
   a cylindrical elongated member having a first and second end;
   a first and second inner sleeve rotatably mounted on said cylindrical member;
   a first and second outer sleeve capable of connecting to said respective first and second inner sleeves, wherein at least a portion of said first and second outer sleeves include threads for engaging a hose being connected to the hose connector, and
   a first and second gasket capable of seating on the cylindrical member, said first and second ends of said cylindrical member include a raised section having a groove therein, and said first and second gaskets are capable of seating in said respective grooves of said first and second ends of said cylindrical member, wherein:
   the smallest diameter of the first and second inner sleeves is sufficiently greater than a diameter of the an outside surface of the cylindrical member to allow the first and second inner sleeves to rotate around the cylindrical member, and the smallest diameter of the first and second inner sleeves is smaller than a diameter of said raised section of the cylindrical member for retaining the inner sleeves on the cylindrical member.

2. The hose connector of claim 1, wherein said first and second outer sleeves include said threads for engaging the hose on an inside surface thereof.

3. The hose connector of claim 1, wherein the threads are dimensioned to threadably engage corrugations on said hose.

4. The hose connector of claim 1, wherein said first and second inner sleeves and said first and second outer sleeves include a gripping mechanism.

5. The hose connector of claim 4, wherein the gripping mechanism comprises ribs.

6. An assembly comprising:
   first and second corrugated insulation hoses; and
   a connector comprising:
      a cylindrical elongated member having a first and second end;
      a first and second inner sleeve rotatably mounted on said cylindrical member; and
      a first and second outer sleeve capable of connecting to said respective first and second inner sleeves,
      wherein the outer sleeves include a first end having an outer surface with a diameter that is smaller than a diameter of an inner surface of the cylindrical member at the first and second end of the cylindrical member to allow for insertion of the first end of the outer sleeves into a respective first or second end of the cylindrical member,
      wherein the outer sleeves include a second end having threads on the inside surface thereof, sized and shaped so that the first and second corrugated insulation hoses, respectively, are received inside and engage the second ends of the first and second outer sleeves.

7. The connector of claim 6, wherein the smallest diameter of the first and second inner sleeves is sufficiently greater than a diameter of the an outside surface of the cylindrical member to allow the first and second inner sleeves to rotate around the cylindrical member.

8. The connector of claim 7, wherein the smallest diameter of the first and second inner sleeves is smaller than a diameter of a raised section of the cylindrical member for retaining the inner sleeves on the cylindrical member.

9. A hose assembly comprising:
   a hose connector including:
      a cylindrical elongated member having a first and second end;
      a first and second inner sleeve rotatably mounted on said cylindrical member, wherein the smallest diameter of the first and second inner sleeves is sufficiently greater than a diameter of the an outside surface of the cylindrical member to allow the first and second inner sleeves to rotate around the cylindrical member, and the smallest diameter of the first and second inner sleeves is smaller than a diameter of a raised section of the cylindrical member for retaining the inner sleeves on the cylindrical member; and
      a first and second outer sleeve connected to said respective first and second inner sleeves to form a first and second combined sleeve, said first and second outer sleeves including threads on an inside surface; and
   at least one hose having corrugations, said corrugations threadably engaged with the threads of the first and second outer sleeves.

10. The hose assembly of claim 9, wherein said hose connector further includes a first and second gasket seated on said cylindrical member.

11. The hose assembly of claim 9, wherein said inner and outer sleeves and said hose engaged thereby are capable of rotating about said cylindrical member.

12. A method of connecting two hoses comprising:
   providing a hose connector comprising a cylindrical elongated member having a first and second end, a first and second inner sleeve rotatably mounted on said cylindrical member, and a first and second outer sleeve having threads on an inside surface, and connected to said respective first and second inner sleeves to form a first and second combined sleeve, wherein the smallest diameter of the first and second inner sleeves is sufficiently greater than a diameter of an outside surface of the cylindrical member to allow the first and second inner sleeves to rotate around the cylindrical member, and the smallest diameter of the first and second inner sleeves is smaller than a diameter of a raised section of the cylindrical member for retaining the inner sleeves on the cylindrical member;
   providing at lease one corrugated hose;
   screwing the hose onto the hose connector; and
   connecting a first and a second outer sleeve to said respective first and second inner sleeves to form a first and second combined sleeve, said first and second outer sleeves including threads on an inside surface that facilitates insertion of the corrugated hose.

13. The method of claim 12, wherein the step of screwing the hose onto the hose connector comprises placing the hose into an end of the outer sleeve and twisting the combined sleeve or the hose, thereby threadably engaging the corrugations of the hose with the threads of the outer sleeves.

14. A hose connector comprising:
   a cylindrical elongated member having a first and a second end, and a respective raised section at the each of the first and second ends, the cylindrical elongated member having a first outer diameter in a region between the first and second ends, the raised sections having an outer diameter that is greater than the first outer diameter and a groove therein; and
   a first and second sleeve disposed on said cylindrical member, at least said first sleeve being capable of rotation about said cylindrical member, one of said first and second sleeves capable of threadably engaging at least one hose, the other of said first and second sleeves having threaded engagement means for threadedly engaging a corrugated pipe, wherein the smallest diameter of the first sleeve is sufficiently greater than the outer diameter of an outside surface of the cylindrical member to allow the first sleeve to rotate around the cylindrical member, and the smallest diameter of the first sleeve is smaller than the outer diameter of the raised section of the cylindrical member for retaining the first sleeve on the cylindrical member;

a first and second gasket capable of seating on the cylindrical member, and said first and second gaskets are capable of seating in said respective grooves of said first and second ends of said cylindrical member.

15. The hose connector of claim 14, wherein said first sleeve comprises a first inner sleeve and a first outer sleeve which are capable of connecting to one another, and said second sleeve comprises a second inner sleeve and a second outer sleeve which are capable of connecting to one another.

16. The hose connector of claim 14, wherein said second sleeve is capable of rotation about said cylindrical member.

17. A connector comprising:

a cylindrical elongated member having a first and a second end, and a respective raised section at the each of the first and second ends, the cylindrical elongated member having a first outer diameter in a region between the first and second ends, the raised sections having an outer diameter that is greater than the first outer diameter and a groove therein; and a first and a second sleeve disposed on said cylindrical member, at least said first sleeve being capable of rotation about said cylindrical member, wherein said first and second sleeves have threaded engagement means for threadedly engaging a corrugated pipe, wherein the smallest diameter of the first sleeve is sufficiently greater than the first outer diameter of the cylindrical member to allow the first sleeve to rotate around the cylindrical member, and the smallest diameter of the first sleeve is smaller than the diameter of a raised section of the cylindrical member for retaining the first sleeve on the cylindrical member;

a first and second gasket capable of seating on the cylindrical member, and said first and second gaskets are capable of seating in said respective grooves of said first and second ends of said cylindrical member.

* * * * *